United States Patent
Lienenkamp

(10) Patent No.: US 9,222,825 B2
(45) Date of Patent: Dec. 29, 2015

(54) DEVICE FOR MEASURING LIQUID FILLING LEVELS

(75) Inventor: Joerg Lienenkamp, Witten (DE)

(73) Assignee: Gaslock GmbH, Iserlohn (DE)

( * ) Notice: Subject to any disclaimer, the term of this patent is extended or adjusted under 35 U.S.C. 154(b) by 245 days.

(21) Appl. No.: 14/000,659

(22) PCT Filed: Feb. 21, 2012

(86) PCT No.: PCT/EP2012/052908
§ 371 (c)(1),
(2), (4) Date: Aug. 21, 2013

(87) PCT Pub. No.: WO2012/113776
PCT Pub. Date: Aug. 30, 2012

(65) Prior Publication Data
US 2013/0327140 A1    Dec. 12, 2013

(30) Foreign Application Priority Data

Feb. 23, 2011 (DE) .................... 20 2011 003 126 U
Dec. 23, 2011 (DE) .................... 20 2011 109 555 U

(51) Int. Cl.
*G01F 23/296* (2006.01)
*G01F 23/00* (2006.01)

(52) U.S. Cl.
CPC .......... *G01F 23/296* (2013.01); *G01F 23/0007* (2013.01); *G01F 23/2961* (2013.01); *G01F 23/2962* (2013.01); *G01F 23/2968* (2013.01)

(58) Field of Classification Search
None
See application file for complete search history.

(56) References Cited

U.S. PATENT DOCUMENTS

| 5,119,676 | A | * | 6/1992 | Bower et al. | ................ | 73/290 V |
| 5,793,705 | A | * | 8/1998 | Gazis et al. | .................... | 367/98 |
| 2003/0043216 | A1 | * | 3/2003 | Usui et al. | .......................... | 347/7 |
| 2004/0035208 | A1 |   | 2/2004 | Diaz et al. | | |
| 2004/0173021 | A1 | * | 9/2004 | Lizon et al. | ................ | 73/290 V |
| 2004/0182149 | A1 | * | 9/2004 | Balin et al. | ................. | 73/290 V |
| 2005/0284218 | A1 | * | 12/2005 | Lagergren | .................. | 73/290 V |
| 2007/0204689 | A1 | * | 9/2007 | Bostrom | .................... | 73/290 V |
| 2008/0184794 | A1 | * | 8/2008 | Kuck et al. | ................. | 73/290 V |
| 2009/0025474 | A1 | * | 1/2009 | Lagergren | .................. | 73/290 V |
| 2009/0038394 | A1 | * | 2/2009 | Zachmann et al. | ......... | 73/290 V |

FOREIGN PATENT DOCUMENTS

DE     198 20 482 C1    7/1999
GB     2 126 342 A      3/1984

OTHER PUBLICATIONS

International Search Report of PCT/EP2012/052908, date of mailing Jul. 6, 2012.

* cited by examiner

*Primary Examiner* — Andre Allen
(74) *Attorney, Agent, or Firm* — Collard & Roe, P.C.

(57) ABSTRACT

The invention relates to a device (1) which uses ultrasound to measure the filling level for liquids in a tank (2). The device (1) consists of a housing (3) in which a piezoelectric disc (4) connected to a circuit board (5) and an energy store (6) is provided. A display unit (8) is arranged in the housing (3), and on the side of the piezoelectric disc (4) that faces the tank (2), the disc is given a layer (11) consisting of elastic material.

10 Claims, 3 Drawing Sheets

DEVICE FOR MEASURING LIQUID FILLING LEVELS

CROSS REFERENCE TO RELATED APPLICATIONS

Figure 1:
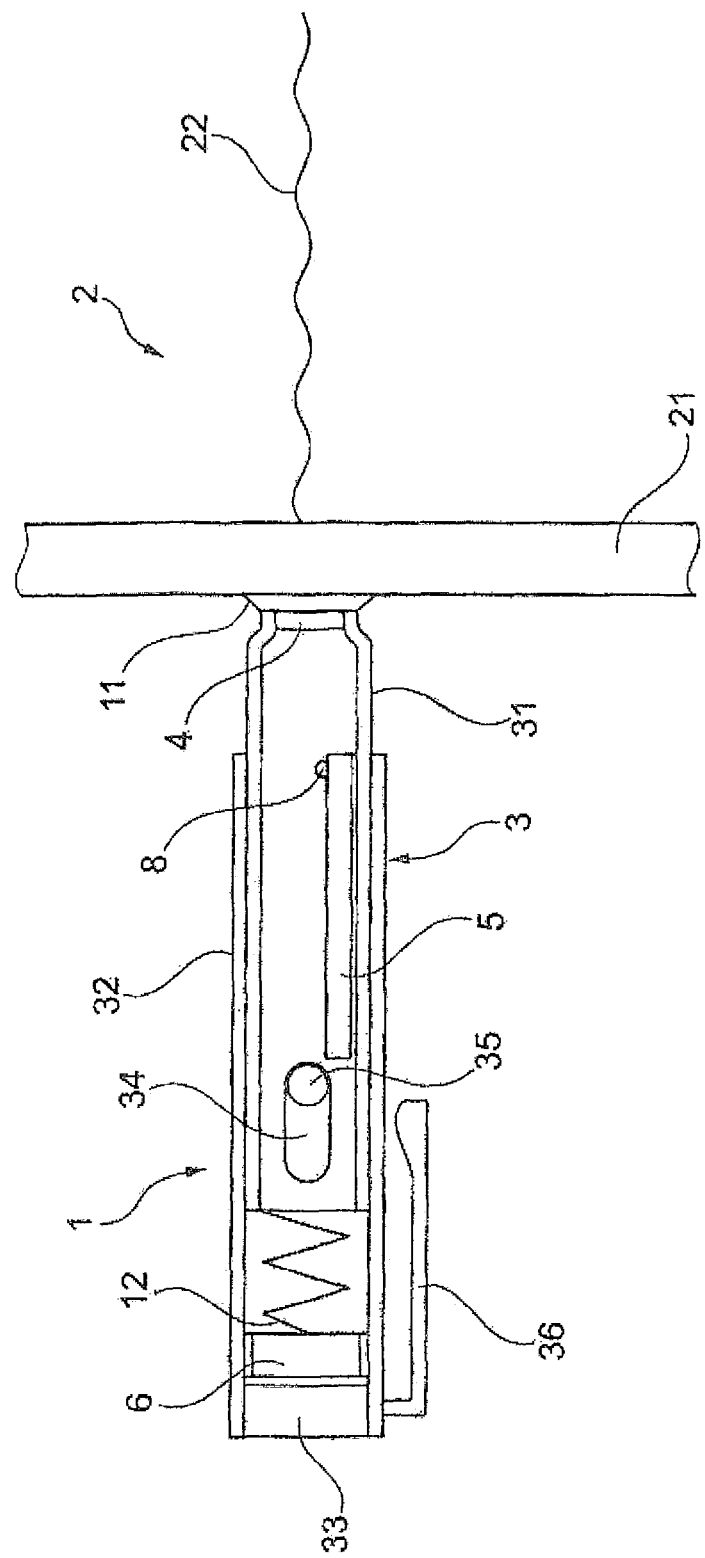

This application is the National Stage of PCT/EP2012/052908 filed on Feb. 21, 2012, which claims priority under 35 U.S.C. §119 of German Application No. 20 2011 003 126.8 filed on Feb. 23, 2011 and German Application No. 20 2011 109 555.3 filed on Dec. 23, 2011, the disclosures of which are incorporated by reference. The international application under PCT article 21(2) was not published in English.

The invention relates to an apparatus for measurement of the filling level of liquids in a tank, by means of ultrasound, consisting of a housing, in which a piezoelectric disk is provided, which stands in connection with a circuit board and an energy storage, and in which housing a display unit is disposed, whereby the piezoelectric disk is provided with a layer of elastic material on its side facing the tank.

Apparatuses for measurement of the filling level of liquids are known in many different ways. Various methods of filling level measurement exist. Mechanical filling level measurements using floats, measurements using the determination of electrical conductivity, capacitative measurements, optical measurements, and the like exist. In the case of the type of filling level measurement being considered here, what is involved is measurement of the filling level using ultrasound. In this connection, ultrasound impulses emitted by a sensor are reflected. The reflected signal is detected by the sensor. The filling level of the medium, in each instance, results from the measured running time of the signal.

In the case of the known apparatuses for measurement of the filling level of liquids, using ultrasound, fixed installation of the apparatus on the tank, in each instance, generally takes place. The installation point is usually provided on the top of the tank. From there, the ultrasound signal is transmitted onto the liquid situated in the tank, and the filling level is determined from the reflection of the signal. It is furthermore possible to provide the apparatus on the underside of the tank. In this case, the same measurement principle is utilized. A disadvantage of the known apparatuses is the additional expenditure resulting from installation of the apparatuses. In addition, there is no possibility of using the devices in mobile manner. This proves to be particularly disadvantageous in the case of tanks having small filling volumes, which are usually not refilled by the user but rather must be completely exchanged. This includes, for example, filling level measurement of gas cylinders for camping purposes. Fixed installation of the apparatuses on these is not justifiable, because of the great expenditure. To eliminate this problem, a mobile filling level measurement device is known from GB 2 126 342 A, in which the filling level in a container can be measured by means of ultrasound, and which has a display device. It is true that the known filling level measurement device offers mobile use; however, it is quite difficult to handle due to its dimensions.

This is where the invention wants to provide a remedy. The invention is based on the task of creating an apparatus for measurement of the filling level of liquids in a tank, by means of ultrasound, in which no fixed installation on the tank, in each instance, is required, and which allows mobile use, furthermore has a simple structure and which is simple to handle and has a very compact construction. According to the invention, this task is accomplished in that the housing consists of two parts that can be moved, relative to one another, counter to the force of a spring, in telescoping manner.

With the invention, an apparatus for measurement of the filling level of liquids in a tank, by means of ultrasound, is created, which does not require fixed installation on the tank, in each instance. This is brought about in that the placement of a layer of elastic material allows air-tight placement on the tank, in each instance, so that a reliable ultrasound measurement is possible. The apparatus according to the invention, allows mobile handling. Consequently, the user of the gas tank, in each instance, is given the opportunity to hold the apparatus against the tank, in each instance, only when needed, and to determine the liquid level. The apparatus according to the invention offers a reliable and simple possibility of measurement of the filling level. The two-part configuration of the housing and its arrangement of parts that can be moved, relative to one another, in telescoping manner, furthermore lead to simple operability and a compact construction.

Preferably, the display unit is formed by an LED light. The use of an LED light is suitable, for one thing, for creating a reliable display, and for another thing, LED lights have a low energy demand, so that the functional duration of the apparatus is increased.

In a further development of the invention, at least one housing part is produced from transparent material. It is advantageous if the display unit is disposed to lie on the inside of the housing part. In this embodiment, it is possible to do without the provision of an additional viewing window or an opening in the housing to make the display unit visible. Instead, the signals of the display unit can be seen through the transparent housing part.

In another further development of the invention, two magnets are disposed in the housing, on the circuit board. The magnets exert a holding force on the tank, so that the apparatus can be permanently attached to the tank, without having to provide additional holding devices for this purpose. At the same time, the holding force of the magnets makes it possible for the rubber layer to be pressed firmly onto the tank, thereby guaranteeing the required sound coupling.

Figure 2:
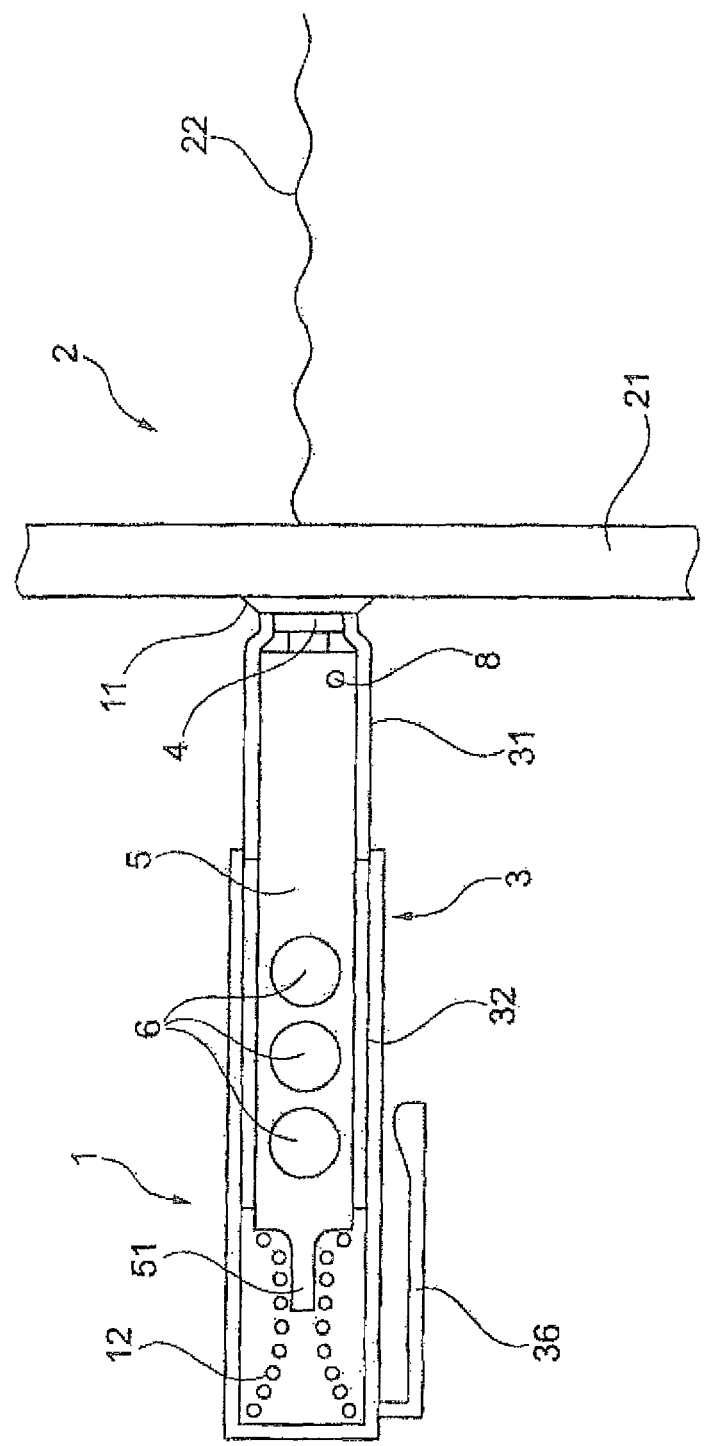
Figure 3:
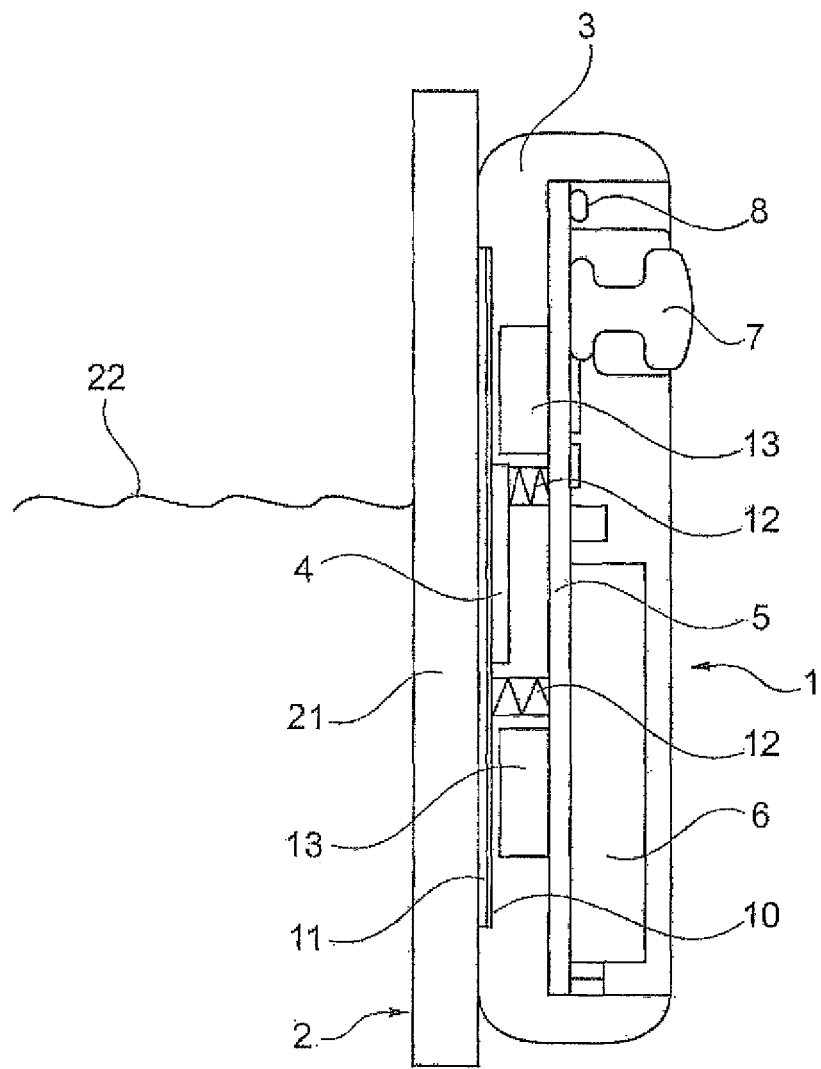

Other further developments and embodiments of the invention are indicated in the remaining dependent claims. An exemplary embodiment of the invention is shown in the drawing and will be described in detail below. The drawing shows:

FIG. 1 the schematic representation of an apparatus for measurement of the filling level of liquids in a tank, by means of ultrasound, in section, in a position in which it is held onto a tank;

FIG. 2 the schematic representation of an apparatus for measurement of the filling level of liquids in a tank, by means of ultrasound, in section, in a position in which it is held onto a tank, in a different embodiment;

FIG. 3 the schematic representation of an apparatus for measurement of the filling level of liquids in a tank, by means of ultrasound, in section, in a position in which it is held onto a tank, in a further embodiment.

The apparatus 1 for measurement of the filling level of liquids in a tank 2, selected as an exemplary embodiment, is based on the ultrasound measurement principle. The apparatus 1 consists of a housing 3 composed of plastic, in which a piezoelectric disk 4 is provided. The disk 4 is produced from ceramic.

The housing consists, in the exemplary embodiment according to FIGS. 1 and 2, of two parts 31, 32, which can be moved relative to one another, counter to the force of a spring 12, in telescoping manner, whereby the housing part 31 is guided in the housing part 32. The housing part 31 is produced from transparent material. In a modification of the exemplary embodiment, it is also possible to produce both housing parts 31 and 32 from transparent material.

In the exemplary embodiment according to FIG. 1, the housing part 32 can be closed off, on its end facing away from the housing part 31, with a screw-on lid 33. In this case, the housing part 32 has an oblong hole 34 in which a pin 35 is guided, which is affixed on the housing part 31 so as to project radially. The movement path of the housing part 31 in the housing part 32 is limited by the length of the oblong hole 34. At the same time, the pin 35 serves for unlocking of the housing parts 31 and 32, in that the pin 35 is pushed under the housing part 32, with exertion of a pressure. The housing part 32 can then be pulled off the housing part 31. In the exemplary embodiment according to FIG. 2, the housing part 32 is configured to be closed at its end facing away from the housing part 31.

A clamping device 36 is provided laterally on the housing part 32, which device extends axially along the housing 3. The piezoelectric disk 4 is disposed at the free end, facing away from the housing part 32, which is situated outside of the housing part 32. It has a diameter that corresponds to that of the free end of the housing part 31.

The disk 4 stands in connection with a circuit board 5. An evaluation unit is provided on the circuit board 5.

Furthermore, a display unit 8 is disposed on the circuit board, which is formed by an LED light in the exemplary embodiment. Placement of multiple LED lights is also possible. The disk 4 furthermore stands in contact with an energy storage 6, which is a battery, in the case of the exemplary embodiment. The energy storage 6 is disposed adjacent to the screw-on lid 33, in the exemplary embodiment according to FIG. 1, so that if needed, replacement of the energy storage 6 is possible in simple manner. In the exemplary embodiment according to FIG. 2, in contrast, the energy storage 6 is disposed on the circuit board 5, whereby it is formed from three batteries. In this case, a flap—not shown—is provided in the housing 3, for replacement of the energy storage 6. In this case, the housing part 32 is configured to be closed at its end facing away from the housing part 31.

On its side facing the tank 2, the disk 4 is provided with a layer 11 composed of an elastic material. The layer 11 is preferably a rubber layer. A layer of thermoplastic elastomer is also possible. The layer 11 excludes air inclusions when the apparatus 1 is laid against the tank 2, so that error-free activation of the apparatus 1 is possible. In this way, the dry coupling that is required for ultrasound measurement probes is guaranteed. The layer 11 can also be configured in the manner of a bowl, in a modification of the exemplary embodiment, so that it encloses the end of the housing part 31 that faces away from the housing part 32, in certain regions.

The housing part 31 supports itself against the spring 12 at its one end, by way of the circuit board 5. In the exemplary embodiment according to FIG. 1, the spring 12 lies against the energy storage 6 in the housing part 32. In the exemplary embodiment according to FIG. 2, in contrast, the spring 12 lies against the closed bottom of the housing part 32 (FIG. 2). Here, the spring 12 has a configuration with a waist. At the same time, the circuit board 5 has a ridge-like extension 51.

In the exemplary embodiment according to FIG. 3, the housing 3 is configured in one part and can be closed off with a flap—not shown. Also, the disk 4 stands in connection with a circuit board 5. The circuit board 5 extends essentially over the entire length of the housing 3. The valuation unit is provided on the circuit board 5. Furthermore, the energy storage 6 is disposed on the circuit board 5; again, this is a battery. The energy storage 6 also stands in contact with the disk 4. Furthermore, the apparatus according to FIG. 3 has an activation means 7 on the circuit board 5, which is a push button in the exemplary embodiment. Other activation means can also be used. Furthermore, the display unit 8, which again is formed by an LED light, is disposed on the circuit board. Placement of multiple LED lights is also possible.

The piezoelectric disk 4 is disposed on a metal plate 10. Using the metal plate 10, the transmission and reception surface of the apparatus is significantly increased in comparison with the size of the piezoelectric disk 4, so that the transmission and reception surface is also increased in size. The metal plate 10 is provided with a layer 11 composed of elastic material on its side facing away from the disk 4 and thereby facing the tank 2. The rubber layer 11 excludes air inclusions when the apparatus 1 is laid against the tank 2, so that error-free activation of the apparatus 1 is possible. In this way, the sound coupling required for ultrasound measurement probes is guaranteed.

The metal plate 10 is connected with the circuit board 5 by means of springs 12. The springs 12 bring about a reliable connection between the metal plate 10 and the circuit board 5, so that transmission and reception quality is permanently guaranteed.

Two magnets 13 are disposed in the housing 3, on the circuit board 5, adjacent to the springs 12. The magnets 13 serve for fastening of the apparatus 1 to the tank 2. With the magnets 13, the possibility is created of permanently disposing the apparatus 1 on the tank 2.

When using the apparatus 1 according to the invention for measurement of the filling level of liquids, the apparatus 1 is laid against the wall 21 of the tank 2, as shown in the figures. In this position, the apparatus 1 comes into contact with the wall 21 of the tank 2 with its layer 11, over a large area. As can be seen in the figures, no air inclusions are present between the layer 11 and the wall 21. In this way, the dry sound coupling required for the ultrasound measurement of the apparatus 1 according to the invention is present. This allows reliable transmission and reception of the ultrasound signals.

After the apparatus 1 is set onto the wall 21 of the tank 2, according to the exemplary embodiments of FIGS. 1 and 2, the user exerts a force onto the apparatus, in the direction of the wall 21. Under the influence of this force, the housing part 32 moves counter to the force of the spring 12, in the direction of the wall 21, so that the housing part 31 moves further into the housing part 32. The immersion depth or the displacement path is limited, in the exemplary embodiment according to FIG. 1, by the length of the oblong hole 34 in the housing part 32; in the exemplary embodiment according to FIG. 2, it is limited by the immersion depth of the ridge 51 into the spring 12. When its maximal immersion depth is reached, the apparatus is put into operation, because in this state, the circuit situated in the apparatus is closed. In the exemplary embodiment according to FIG. 2, this takes place in that the ridge 51 comes into contact with the spring 12. As a result of the closed circuit, sound impulses are emitted by the piezoelectric disk 4. These enter into the tank 2 by way of the metal plate 10, through the layer 11 and the wall 21. After the apparatus 1 has been set onto the wall 21 of the tank 2 according to the exemplary embodiments of FIGS. 1 and 2, the magnets 13, in contrast, create reliable placement on the tank 2. The layer 11 is firmly pressed onto the wall 21 of the tank 2 by means of the magnetic force.

If the apparatus 1, in each instance, has been set on in a region of the tank 2 in which there is no liquid, the sound will be reflected directly by the tank. Therefore the emitted sound impulses will be received by the receiver of the apparatus after an extremely short running time. This is indicated by a signal in the display unit 8, by way of the circuit board 5 with its evaluation unit. In the exemplary embodiment, this is shown in the form of a red light signal of the LED provided. If, in contrast, the apparatus 1 has been set on in a region in which there is a liquid, in other words below the filling level of the liquid indicated with 22 in the exemplary embodiment, the ultrasound signals emitted by the apparatus 1 are transported through the liquid. The sound impulses are then reflected from the wall of the tank 2 that lies opposite the apparatus 1, and transported back through the liquid, until they are received by the apparatus 1. The running time until the emitted signals are received by the apparatus is therefore clearly greater than in the case described above. These received signals are also passed on to the evaluation unit situated on the circuit board, which recognizes the longer running time. The evaluation unit controls the display unit 8 to trigger a corresponding signal, which is indicated, in the exemplary embodiment, by means of an LED that lights up green.

With the apparatus according to the invention, it is possible to display the filling level of liquid even in small tanks, in simple manner. The precise determination of the filling level takes place in that the apparatus 1 is set onto the wall 21 of the tank 2, and, with the force exerted on the apparatus 1, i.e. turning on the activation device 7, the apparatus 1 is moved up and down along the wall 21. When the filling level is reached, the display unit changes the signal, so that the user recognizes the height at which the filling level is situated. Because of its simplicity and space-saving construction, the apparatus can be used in mobile manner, so that it can be transported in a pocket, for example, and therefore can be constantly kept on hand during camping use. Furthermore, by means of the clamping device 36 in the exemplary embodiments according to FIGS. 1 and 2, the possibility is created of affixing the apparatus 1 on the pocket of an article of clothing, in the manner of a writing implement. The risk of loss is thereby reduced.

The invention claimed is:

1. Apparatus (1) for measurement of the filling level of liquids in a tank (2), via ultrasound, comprising a housing (3), in which a piezoelectric disk (4) is provided, which stands in connection with a circuit board (5) and an energy storage (6), and in which housing a display unit (8) and a spring are disposed, wherein the piezoelectric disk (4) is provided with a layer (11) of elastic material on its side facing the tank (2); wherein the housing (3) comprises first and second housing parts (31, 32) connected by the spring, which are movable, relative to one another, counter to the force of the spring (12), in telescoping manner.

2. Apparatus according to claim 1, wherein the elastic material is rubber.

3. Apparatus according to claim 1, wherein the elastic material is a thermoplastic elastomer.

4. Apparatus according to claim wherein the display unit (8) is formed by at least one LED light.

5. Apparatus according to claim 1, wherein at least one of the first and second housing parts (31, 32) is produced from transparent material.

6. Apparatus according to claim 1, wherein the display unit (8) is disposed to lie inside the housing part (31).

7. Apparatus according to claim 1, wherein the piezoelectric disk (4) is disposed on a metal plate (10).

8. Apparatus according to claim 7, wherein the electrical connection of the metal plate (10) with the circuit board (5) takes place by way of the spring (12).

9. Apparatus according to claim 1, wherein the first housing part is connected to the spring by way of the circuit board.

10. Apparatus according to claim 1, wherein the second housing part is connected to the spring by way of the energy storage.

* * * * *